United States Patent
Narayan et al.

(10) Patent No.: US 10,992,902 B2
(45) Date of Patent: Apr. 27, 2021

(54) ASPECT RATIO CONVERSION WITH MACHINE LEARNING

(71) Applicant: Disney Enterprises, Inc., Burbank, CA (US)

(72) Inventors: Nimesh C. Narayan, Los Angeles, CA (US); Yazmaliza Yaacob, Los Angeles, CA (US); Kari M. Grubin, Woodland Hills, CA (US); Andrew J. Wahlquist, Downey, CA (US)

(73) Assignee: Disney Enterprises, Inc., Burbank, CA (US)

( * ) Notice: Subject to any disclaimer, the term of this patent is extended or adjusted under 35 U.S.C. 154(b) by 15 days.

(21) Appl. No.: 16/360,944

(22) Filed: Mar. 21, 2019

(65) Prior Publication Data

US 2020/0304755 A1     Sep. 24, 2020

(51) Int. Cl.
*H04N 7/01*     (2006.01)
*G06F 3/0484*   (2013.01)
(Continued)

(52) U.S. Cl.
CPC ....... *H04N 7/0122* (2013.01); *G06F 3/04845* (2013.01); *G06K 9/00288* (2013.01);
(Continued)

(58) Field of Classification Search
CPC .......... G06K 9/00335; G06K 9/00684; H04N 7/0122; G06F 3/04845
See application file for complete search history.

(56) References Cited

U.S. PATENT DOCUMENTS

| 8,917,329 B1* | 12/2014 | Woodman ...... H04N 21/234372 |
| | | 348/222.1 |
| 2004/0252238 A1* | 12/2004 | Park ..................... H04N 7/0122 |
| | | 348/556 |

(Continued)

FOREIGN PATENT DOCUMENTS

| WO | 2020061172 A1 | 3/2020 |
| WO | 2020132371 A1 | 6/2020 |

OTHER PUBLICATIONS

Nazeri et al., "Image Colorization with Generative Adversarial Networks," LNCS 10945 (2018) 85-94.
(Continued)

*Primary Examiner* — Santiago Garcia
(74) *Attorney, Agent, or Firm* — Patterson + Sheridan, LLP

(57) ABSTRACT

Techniques are disclosed for converting image frames, such as the image frames of a motion picture, from one aspect ratio to another while predicting the pan and scan framing decisions that a human operator would make. In one configuration, one or more functions for predicting pan and scan framing decisions are determined, at least in part, via machine learning using training data that includes historical pan and scan conversions. The training data may be prepared by extracting features indicating visual and/or audio elements associated with particular shots, among other things. Function(s) may be determined, using machine learning, that take such extracted features as input and output predicted pan and scan framing decisions. Thereafter, the image frames of a received video may be converted between aspect ratios on a shot-by-shot basis, by extracting the same features and using the function(s) to make pan and scan framing predictions.

21 Claims, 6 Drawing Sheets

(51) Int. Cl.
*G06K 9/00* (2006.01)
*G06K 9/62* (2006.01)

(52) U.S. Cl.
CPC ..... *G06K 9/00335* (2013.01); *G06K 9/00684* (2013.01); *G06K 9/00718* (2013.01); *G06K 9/00744* (2013.01); *G06K 9/6228* (2013.01); *G06K 9/6254* (2013.01); *G06K 9/6256* (2013.01); *G06K 2209/27* (2013.01)

(56) References Cited

U.S. PATENT DOCUMENTS

| | | | |
|---|---|---|---|
| 2006/0177110 A1* | 8/2006 | Imagawa | G06K 9/00228 382/118 |
| 2007/0211074 A1 | 9/2007 | Yeung | |
| 2008/0159605 A1* | 7/2008 | Ramsay | G06K 9/00 382/128 |
| 2009/0051819 A1* | 2/2009 | Hasegawa | G06T 3/4007 348/699 |
| 2009/0174726 A1 | 7/2009 | Ollivier | |
| 2010/0128181 A1* | 5/2010 | Jagmag | H04N 5/2628 348/581 |
| 2012/0045095 A1 | 2/2012 | Tate et al. | |
| 2013/0279802 A1* | 10/2013 | van der Merwe | G06T 7/11 382/165 |
| 2014/0022460 A1 | 1/2014 | Li et al. | |
| 2014/0172643 A1 | 6/2014 | Fazl Ersi et al. | |
| 2014/0253545 A1 | 9/2014 | Sullivan et al. | |
| 2014/0280258 A1 | 9/2014 | Nicholas | |
| 2015/0139603 A1* | 5/2015 | Silverstein | H04N 1/212 386/225 |
| 2015/0207960 A1 | 7/2015 | Tomlinson et al. | |
| 2016/0198142 A1 | 7/2016 | Sandrew et al. | |
| 2016/0261772 A1 | 9/2016 | McElvain | |
| 2016/0307602 A1 | 10/2016 | Mertens | |
| 2017/0076438 A1 | 3/2017 | Kottenstette et al. | |
| 2017/0127127 A1 | 5/2017 | Zavesky et al. | |
| 2017/0228137 A1* | 8/2017 | Carlos | G06T 11/60 |
| 2017/0236407 A1 | 8/2017 | Rhoads et al. | |
| 2018/0040153 A1* | 2/2018 | Tanigawa | G06T 11/60 |
| 2018/0241929 A1 | 8/2018 | Bouzaraa et al. | |
| 2019/0052908 A1 | 2/2019 | Mertens et al. | |
| 2020/0051217 A1 | 2/2020 | Shen et al. | |
| 2020/0051260 A1 | 2/2020 | Shen et al. | |
| 2020/0175337 A1* | 6/2020 | Ho | G06K 9/6262 |
| 2020/0184620 A1* | 6/2020 | Biernacki | G01N 33/46 |

OTHER PUBLICATIONS

U.S. Appl. No. 16/356,840, Entitled "Machine Learning Color Science Conversion", filed Mar. 18, 2019.

* cited by examiner

ASPECT RATIO CONVERSION WITH MACHINE LEARNING

BACKGROUND

Field of the Disclosure

Aspects presented in this disclosure generally relate to converting image frames of a video between aspect ratios.

Description of the Related Art

The aspect ratio of an image is a proportional relationship between a width of the image and a height of the image. Motion picture content is typically created for theatrical distribution in a wide-screen aspect ratio, such as the 2.39:1 aspect ratio, that is wider than aspect ratios supported by in-home display devices, such as the 1.78:1 aspect ratio for high-definition televisions. As a result, image frames of motion pictures in wide-screen aspect ratios need to be converted to smaller aspect ratios for home video distribution. One approach for aspect ratio conversion is pan and scan, which entails reframing image frames to preserve the primary focus of scenes depicted therein, while cropping out the rest of the image frames (e.g., the sides of wide-screen aspect ratio image frames). The faming decisions may include shifting the preserved window left or right to follow the action in a scene, creating the effect of a "pan" shot, and ensuring that the focus of each shot is preserved (i.e., "scanned"). Traditional pan and scan requires manual decisions to be made on how to represent on-screen action throughout a motion picture in a new aspect ratio, which can be both labor intensive and time consuming.

SUMMARY

One aspect of this disclosure provides a computer-implemented method for converting image frames between aspect ratios. The method generally includes determining using machine learning at least one aspect ratio conversion function based, at least in part, on (i) extracted features which indicate at least one of visual or audio elements associated with first image frames in shots from videos in a first aspect ratio, and (ii) manual framing decisions in pan and scan conversions of the first image frames to corresponding second image frames in a second aspect ratio. The method further includes identifying shots in a received video, and, for each image frame in each shot of the identified shots, converting the image frame from the first aspect ratio to the second aspect ratio using one of the at least one aspect ratio conversion function.

Other aspects include, without limitation, a computer-readable medium that includes instructions that enable a processing unit to implement one or more aspects of the disclosed method, as well as a system configured to implement one or more aspects of the disclosed method.

BRIEF DESCRIPTION OF THE DRAWINGS

So that the manner in which the above recited aspects are attained and can be understood in detail, a more particular description of aspects of this disclosure, briefly summarized above, may be had by reference to the appended drawings.

It is to be noted, however, that the appended drawings illustrate only typical aspects of this disclosure and are therefore not to be considered limiting of its scope, for the disclosure may admit to other equally effective aspects.

DETAILED DESCRIPTION

Figure 1:
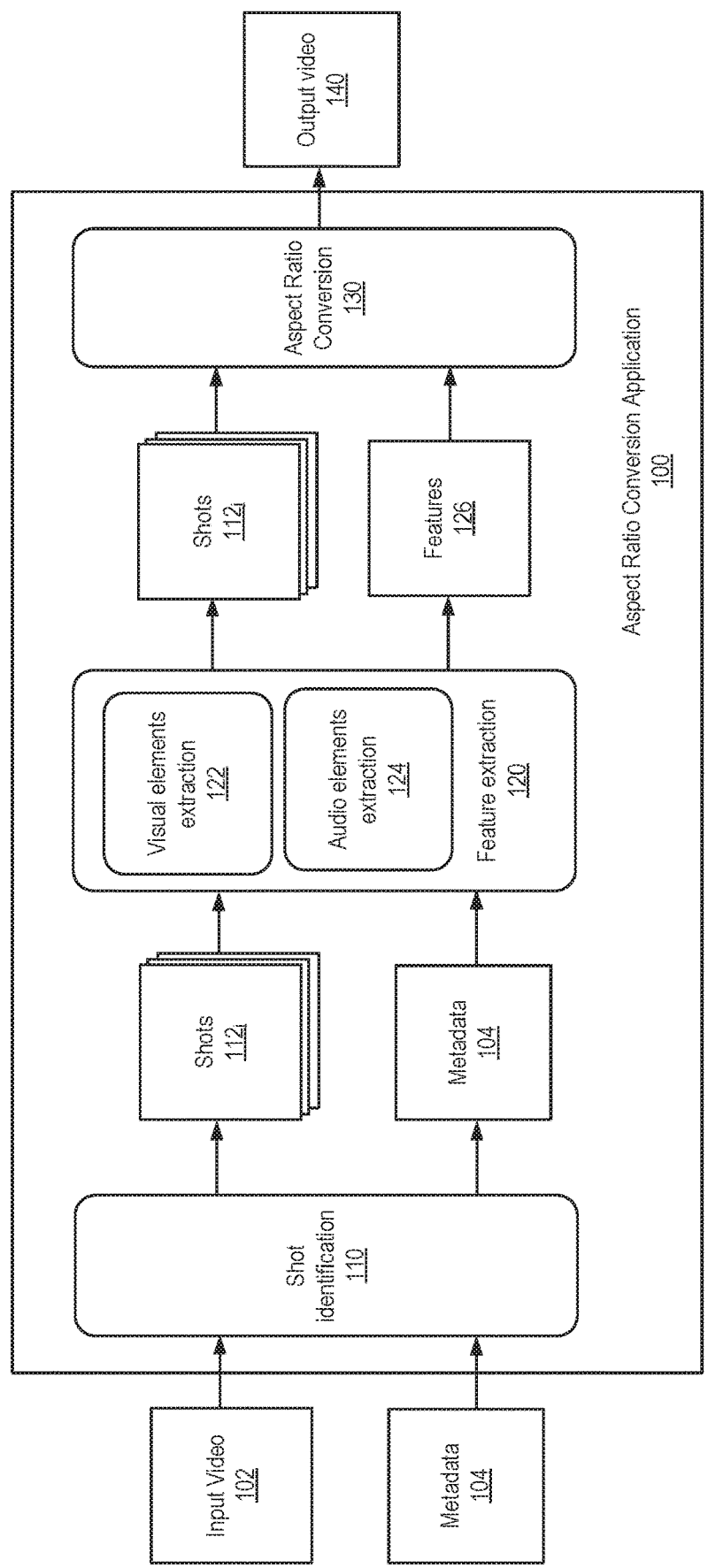
FIG. 1 illustrates an approach for converting image frames of a video between aspect ratios, according to an aspect of this disclosure.

Aspects presented herein provide an approach for converting image frames, such as those of a motion picture, from one aspect ratio to another while predicting the pan and scan framing decisions that a human operator would make. In one configuration, one or more functions for predicting pan and scan framing decisions are determined using machine learning and training data that includes historical pan and scan conversions made by hand. Each of the function(s) may include one or more rules and/or models for mapping an input, such as features extracted from a shot in a video, to an output, such as pan and scan framing predictions for image frames in the shot. As used herein, a "shot" refers to a series of interrelated consecutive image frames in a video taken contiguously by one or more cameras and representing a continuous action in time and space. Training data (and later inference data) may be prepared by extracting features that indicate visual and/or audio elements associated with particular shots in training videos. Function(s) may be determined, using machine learning, that take such extracted features as input and output predicted pan and scan framing decisions. Subsequent to obtaining such function(s), the image frames of a received video may be converted between aspect ratios on a shot-by-shot basis, by extracting the same features and using the function(s) to make pan and scan framing predictions for image frames in each shot in the video.

In the following, reference is made to aspects of the present disclosure. However, it should be understood that this disclosure is not limited to specific described aspects. Instead, any combination of the following features and elements, whether related to different aspects or not, is contemplated to implement and practice the aspects disclosed herein. Furthermore, although aspects may achieve advantages over other possible solutions and/or over the prior art, whether or not a particular advantage is achieved by a given aspect is not limiting of this disclosure. Thus, the following aspects, features, configurations and advantages are merely illustrative and are not considered elements or limitations of the appended claims except where explicitly recited in a claim(s). Likewise, reference to "the aspect" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware configuration, an entirely software configuration (including firmware, resident software, micro-code, etc.) or a configuration combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., an aspect ratio conversion application) or related data available in the cloud. For example, the aspect ratio conversion application could execute on a computing system in the cloud and convert the image frames in a received video from one aspect ratio to another according to techniques disclosed herein and store the converted image frames at a storage location in the cloud. Doing so allows a user to access this information from any computing system attached to a network connected to the cloud (e.g., the Internet).

Referring now to FIG. 1, an approach is shown for converting image frames of a video between aspect ratios, according to an aspect of this disclosure. As shown, an aspect ratio conversion application 100 includes a shot identification module 110, a feature extraction module 120, and an aspect ratio conversion module 130. The aspect ratio conversion application 100 receives as input a video 102, such as a film or an episode of an episodic series, as well as associated metadata 104 and an indication of aspect ratios to convert between. The metadata 104 may include information associated with the entire input video 102 (e.g., a film maker who created the video, a film studio, etc.) and/or information associated with particular shots or image frames in the video 102 (e.g., the time of day or objects appearing in a particular shot or image frame). The aspect ratio conversion application 100 is configured to determine pan and scan framings predictive of what a user such as a film maker would choose in converting image frames of the video 102 between different image frame aspect ratios. The aspect ratio conversion application 100 then crops the image frames of the video 102 based on the determined pan and scan framings and outputs a video 140 whose image frames are represented in the output aspect ratio. For example, the image frames of the input video 102 may be an original version of the image frames created for theatrical distribution in a wide-screen aspect ratio (e.g., the 2.39:1 aspect ratio), and the aspect ratio conversion application 100 may convert such image frames to image frames of the output video 140 in an aspect ratio that is supported by in-home display devices (e.g., the 1.78:1 aspect ratio) while predicting the creative choices that a film maker would make.

The shot identification module 110 is configured to identify distinct shots $112_i$ within the input video 102. As described, each shot $112_i$ is a series of interrelated consecutive image frames taken contiguously by a camera (or multiple cameras) and representing a continuous action in time and space. Automated techniques are known for detecting the boundaries of shots in a video, and the aspect ratio conversion application 100 may use such shot boundary detection technique(s) in some configurations. In another configuration, the metadata 104 associated with the video 102 may indicate the boundaries of shots, in which case the shot identification module 110 may identify the shots $112_i$ in the input video 102 from such metadata 104. Each of the identified shots $112_i$ is then processed (sequentially or in parallel with other identified shots) to determine pan and scan conversions of image frames therein.

The feature extraction module 120 is configured to determine a set of features 126 associated with image frames in each of the shots $112_i$ identified from the input video 102. Features are properties and/or characteristics of data that may be used (1) during a training phase along with examples of desired output, which is also sometimes referred to as labeled data, to obtain rules and/or models via machine learning, and (2) during an inference phase to make predictions with the rules and/or models given new data. Each desired feature may be determined from the image frames of an identified shot $112_i$ or from associated metadata, which may provide certain features and/or information from which features may be derived. Although shown for illustrative purposes as being performed by the feature extraction module 120, feature extraction may also be performed elsewhere in some configurations. For example, the aspect ratio conversion module 130 may employ models such as convolutional neural networks which themselves include feature extraction layers. As another example, some features may be automatically determined or manually tagged elsewhere and indicated, e.g., in metadata associated with the shot $112_i$ or in a database, in which cases the feature extraction module 120 may obtain such features from the metadata or the database.

As shown, the feature extraction module 120 includes a visual feature extraction module 122 and an audio feature extraction module 124. The visual and audio feature extraction modules 122 and 124 are responsible for extracting features indicative of visual and audio elements associated with shots in the input video 102, respectively. In one configuration, the visual elements include objects such as characters that appear in the image frames of a shot, directions that the characters face, tracked movements of the objects in 2D space (i.e., the x-y locations of the objects) over the course of the shot, among other things, as discussed in greater detail below. And the audio elements may include character(s) who are speaking in a shot, a topic of dialog in a shot, and music being playing in a shot if there is no dialog, as discussed in greater detail below. In such a case, the feature extraction module 120 may determine the characters and directions the characters are facing, movements of the characters, speaking characters, topics of dialog, and/or music as the features 126 for input into predictive techniques that output pan and scan framing predictions based on such features 126. The predictive techniques may include function(s) determined at least in part via machine learning to identify and protect important regions of each image frame in a shot. For example, regions depicting speaking characters, regions depicting characters when only music is playing, regions depicting the topic of a dialog, etc. may be protected when predicting the pan and scan framing decisions a user would make, as discussed in greater detail below.

The feature extraction module 120 may employ any suitable techniques to identify and localize objects such as characters in the image frames of a shot, track the movements of those objects, determine which direction characters are facing, identify characters who are speaking or music being played, and determine the topic of dialog. For example, one or more machine learning models, such as convolutional neural networks (CNNs), support vector machines (SVMs), or variants thereof, may be trained based on labeled training data to classify and localize objects such as characters, creatures, props, on-screen text, and/or environments, as well as the direction that characters are facing, and the visual feature extraction module 122 in the feature extraction module 120 may input each image frame from a shot into such trained machine learning model(s) to detect objects therein and the direction that characters are facing. As another example, the visual feature extraction module 122 may identify characters who are speaking based on mouth movement, in which case trained machine learning model(s) may again be used to detect the mouths of characters in image frames, and the visual feature extraction module 122 may further determine whether the detected mouths change from frame to frame, indicating that the character is speaking. Alternatively, the speaking characters may be identified via voice recognition and matching of the recognized voices to visually-identified characters (via, e.g., facial recognition), or based on an associated script such as a Combined Continuity Script (CCSL) indicating which characters are speaking in each shot. As yet another example, the audio feature extraction module 124 may compare a fingerprint of audio in a shot to the fingerprints of songs in a database to determine whether music is playing and/or identify particular songs that may be indicative of the mood of the shot. As an additional example, the topic of dialog in a shot may be determined by applying natural language processing techniques such as topic extraction to a portion of the CCSL associated with the shot or text generated via speech-to-text techniques subsequent to recognizing a character's voice. As described, one or more features may also be indicated in received metadata (or elsewhere such as a database), in which case the feature extraction module 120 may obtain such features directly from the metadata (or elsewhere).

Aside from identifying objects, their movements, the directions that characters are facing, speaking characters or music, and the subject of dialog, the feature extraction module 120 may determine other visual and/or audio elements in some configurations. For example, visual elements other than objects, their movements, and the directions that characters face may be identified, including the image characteristics of image frames in a shot such as whether the image frames are bright or dark; whether the image frames depict day or night scenes; the contrast, saturation, grain, and/or sharpness of the image frames; animations depicted in the image frames, etc., as well as technical information such as camera lenses used to capture the image frames of a shot, whether the image frames depict digital or film images, whether the image frames depict live action or animated content, a year, etc. Whether an image frame is bright or dark, depicts day or night, etc. is also referred to herein as a nature of the scene being depicted. Additional features that feature extraction module 120 may determine include features indicative of creative information such as a film maker, brand, genre, film company, episodic series, franchise, etc. associated with the input video 102. Once again, the image characteristics, technical information, and creative information features may be determined using any suitable techniques, by the feature extraction module 120 itself and/or from manually tagged information in metadata. For example, the creative information such as the film maker, brand, genre, film company, episodic series, franchise, etc. may be indicated in the metadata 104 that is received along with the video 102. As another example, the feature extraction module 120 may query a database to obtain such information. Similarly, the technical information such as the camera lenses used to capture image frames of a shot, whether the image frames depict digital or film images, whether the image frames depict live action or animated content, the year, etc. may be indicated in the received metadata 104 or determined by the feature extraction module 120 itself. As another example, automated techniques are known for predicting the time of day of a scene, and the visual feature extraction module 122 may use such a technique to determine whether a daytime or nighttime scene is depicted in the image frames of a shot.

Figure 2:
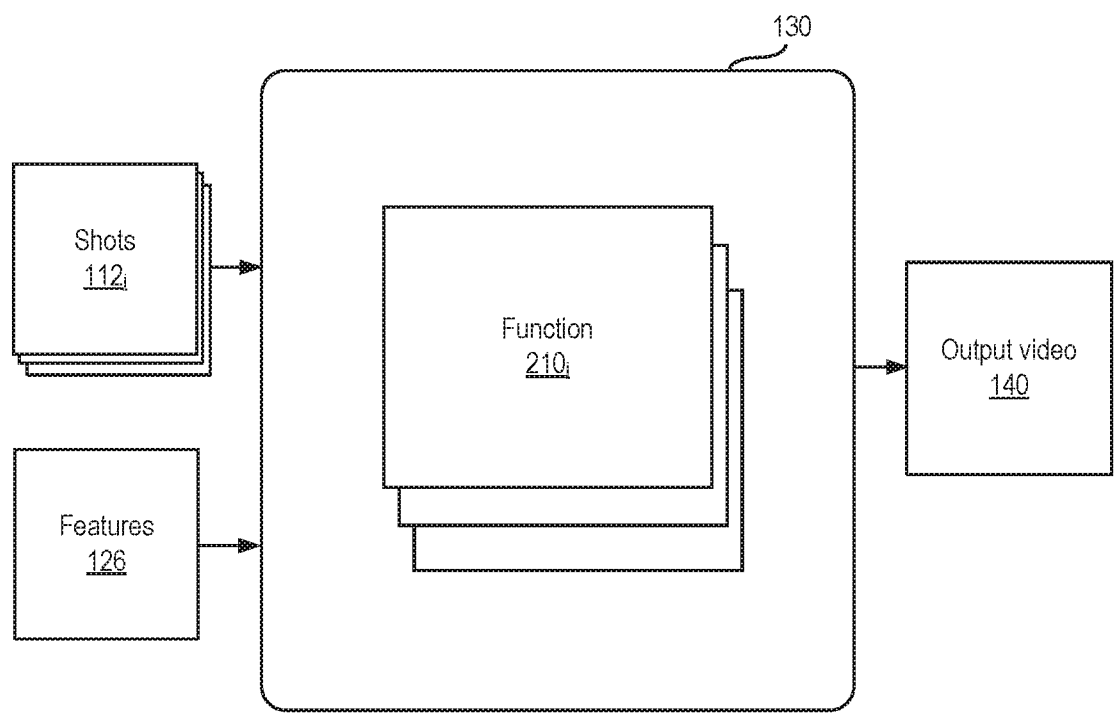
FIG. 2 illustrates an aspect ratio conversion module in greater detail, according to an aspect of this disclosure.

The aspect ratio conversion module 130 is configured to employ one or more predictive techniques to determine, for each identified shot in the received video 102 and based on extracted features, including the features extracted by the feature extraction module 120, a pan and scan framing for each of the image frames in the shot. FIG. 2 illustrates the aspect ratio conversion module 130 in greater detail, according to an aspect of this disclosure. As shown, the aspect ratio conversion module 130 determines a conversion between aspect ratios, given the identified shots 112$_i$ and the extracted features 126, using one or more functions 210$_i$ that are determined using machine learning but may also include user-defined rules. As described, each of the function(s) may include one or more rules and/or models for mapping an input to an output. Although rules and models are sometimes discussed herein as being distinct, in some configurations, the models may themselves include rules. In other configurations, only rules or only models may be used. That is, the aspect ratio conversion module 130 may generally utilize any suitable rule(s) and/or model(s).

A function may include one or more rules that are automatically inferred and/or user-defined. In particular, the rules may include if-then rules. In one configuration, if-then rules are defined by a user to constrain the output of the aspect ratio conversion, thereby providing scene-by-scene or scenario-by-scenario restrictions on the pan and scan framing predictions made by the aspect ratio conversion module 130. For example, a user-defined rule may specify that if a character is speaking in a shot, then the speaking character must appear in the reframed image frames of the shot, i.e., the automatically predicted pan and scan framing must preserve the speaking character. As another example, a user-defined rule may specify that if only music is playing when a character appears in the image frames of a shot, then that character must also appear in the reframed image frames of the shot. Yet another user-defined rule may specify that if the image frames of a shot depict a daytime scene with the sun, then the reframed image frames of the shot should not pan toward the sun. Although described herein as being user-defined rules, it should be understood that such rules may also be learned or adjusted via machine learning, as discussed in greater detail below.

The rule(s) in a function may also include if-then rules that are automatically determined via machine learning technique(s), in addition to or in lieu of user-defined rules. In particular, the automatically determined rules may solve the regression problem of predicting pan and scan framings for converting the image frames of a video from one aspect ratio to another. In one configuration, the rules include rules formed by paths from the root node to the leaf nodes of a decision tree or variant thereof, which may also be considered a model. A decision tree is a tree-like model with internal nodes representing tests of feature values, leaves specifying classification or regression outputs, and branches for different values of the feature at each node. For example, one rule in a decision tree may specify that if the film maker is A, the brightness in the image frames of a shot is above a threshold value (indicating, e.g., a daytime scene), a single speaking character appears in the image frames of the shot, the size of the character is within a certain range, the direction the character's face is pointing is within another range, and the character moves from one x-y location range to another from the first image frame to the last image frame of the shot, then the pan and scan conversion should crop the image frames of the shot by cutting certain percentages from the left and right sides of the first image frame while moving the cuts to other percentages from the left and right sides of the last image frame, with the cuts made to intermediate image frames being between those made to the first and last image frames, thereby creating a "pan" shot effect. Another rule in such a decision tree may specify that for the same film maker, brightness level, and speaking character, but with the speaking character being at different locations in the first and last image frames of the shot, then the pan and scan conversion should cut different percentages from the left and right sides of the image frames of the shot and/or create a different pan effect; etc. A decision tree that produces such regression outputs indicating how to crop the image frames of a shot based on input features (the film maker, brightness, speaking character, facing direction, character size, and character movement in the example above), which is sometimes referred to as a regression tree, may be learned via any suitable decision tree algorithm based on historical pan and scan conversion examples, from which features may be extracted and manual framing decisions used as examples of desired output in the training. Examples of algorithms that may be used to learn decision trees include ID3 (Iterative Dichotomiser 3), C4.5, CART (Classification and Regression Tree), CHAID (Chi-squared Automatic Interaction Detector), and MARS (Multiple Adaptive Regression Splines). The process of training a model such as a decision tree is discussed in greater detail below with respect to FIG. 3. In some configurations, multiple decision trees or variants thereof, such as those of a random forest, may be learned. For example, multiple decision trees may be trained using appropriate training data, such as distinct decision trees for predicting pan and scan conversions between different input and output aspect ratios, or for different genres (e.g., live action, animated, action, comedy, etc.), film franchises, or overall styles.

In another configuration, the rule(s) in a function may include rules in a knowledge-based system. In such a case, the rules may be stored in a knowledge base along with facts relating to historical pan and scan conversions, and an inference engine may apply the stored rules to make pan and scan framing predictions for the image frames of an input video. Further, the stored rules may include rules that are learned in any suitable manner, such as using rule-based machine learning techniques, and/or the stored rules may include user-defined rules such as those described above. For example, a rule that is not predictive of historical manual aspect ratio conversions may be discarded, or its parameter values changed, through a machine learning process.

In some configurations, the rule(s) in a function may also be re-learned as more examples of manual aspect ratio conversions become available. In addition, the rule(s) may be tuned by, e.g., reinforcing rules that make correct predictions while adjusting the parameters of rules that make incorrect predictions.

In addition to or in lieu of rule(s), a function may include one or more models that are trained via machine learning technique(s) to solve the regression problem of predicting pan and scan framings for converting the image frames of a video from one aspect ratio to another. As described, an example of such a model is a decision tree or variant thereof, which may be used in some configurations of the aspect ratio conversion application 100. In alternative configurations, the model(s) in a function may include one or more deep learning models. Deep learning models include artificial neural networks having multiple layers between an input and an output layer. Such deep learning models may be trained using, e.g., back-propagation with gradient descent or variants thereof, and any suitable loss function(s) may be minimized during the training under a loss minimization framework, such as manually-specified loss function(s) or automatically determined loss function(s). Like the decision trees described above, multiple deep learning models may be trained using appropriate training data in some configurations, such as distinct deep learning models for predicting pan and scan conversions between different input and output aspect ratios, or for different genres (e.g., live action, animated, action, comedy, etc.), film franchises, or overall styles. As another example, distinct deep learning models may be trained to predict the creative decisions that different film makers or film companies would make so that if, e.g., films by particular film makers or film companies tend to have a unique feel after manual pan and scan conversions are performed due to specific creative choices, then the models may make predictions that mimic the same feel. After the models are trained, the aspect ratio conversion module 130 may select one of the trained models (e.g., for the appropriate input and output aspect ratios, film maker, etc.) and then input features extracted from identified shots in the input video 102 and/or image frames from the identified shots themselves into the selected deep learning model, which in turn outputs predicted pan and scan framings for each of the image frames.

Convolutional neural networks and variants thereof are an example of deep learning architectures that may be trained to predict pan and scan decisions that a film maker would make in converting image frames of the shots in a video from one aspect ratio to another. A CNN generally comprises a number of feature extraction layers, including convolutional and pooling layers, as well as fully connected layers that make predictions based on features extracted by the feature extraction layers. In one configuration, feature extraction layers that were previously trained on a large data set of images (such as the ImageNet image set) are combined (with or without being re-trained) with fully connected layers that are trained to make pan and scan framing predictions for aspect ratio conversion purposes, and an output layer of the CNN may include nodes (e.g., four nodes) that output the pan and scan framing prediction as coordinates where an input image frame in one aspect ratio should be cropped to represent the image frame in another aspect ratio. Such a CNN may be trained using pan and scan framing decisions made by hand as examples of desired output, essentially learning to emulate the framing decisions made by hand. Further, a "pan" effect may be achieved by, e.g., predicting using the CNN how to reframe the first and last image frames of a shot (or keyframes in the shot) and determining reframings that are between those of the first and last image frames (or keyframes) for intermediate image frames in the shot, or in any other suitable manner. Although CNNs are described herein as a reference example, other suitable deep learning models (e.g., generative adversarial networks (GANs), autoencoders, or variants thereof) may be used in conjunction with or in lieu of CNNs.

In some configurations, one or more of the functions $210_i$ may include rules that are used to constrain what is output, before and/or after a model is employed. Continuing the example from above in which a user-defined rule specifies that if a character is speaking in a shot, then the speaking character must appear in the reframed image frames of the shot, the aspect ratio conversion application 100 may, before each image frame from the shot is input into a deep learning model, extract a portion of the image frame that could be cropped to the desired aspect ratio size while preserving the speaking character in the output image frame, and then input only the extracted portion of the image frame (resized to a size that the deep learning model takes as input, if appropriate) into the deep learning model. Doing so ensures that the output of the deep learning model is a framing prediction that, when applied to crop the original image frame, does not remove the speaking character. As another example, the same rule that a speaking character must appear in the reframed image frames of a shot may be applied, after the fact, by the aspect ratio conversion application 100 to check whether the pan and scan framing predictions made by the deep learning model produces output image frames that depict the speaking character and, if the output image frames do not depict the speaking character, then the aspect ratio conversion application 100 may adjust the pan and scan framing output by the deep learning model to satisfy the rule and/or raise an alert so that a user can manually adjust the pan and scan framing output by the deep learning model. In yet another configuration, the deep learning model may itself be trained (e.g., by training the fully connected layers of a CNN or training a different type of model such as a conditional GAN, or variants thereof) to account for speaking characters and other features such as the features described above indicating visual (e.g., image characteristics and technical information) and audio (e.g., speaking characters, music, topic of a dialog) elements of a shot and/or creative information.

Although decision trees, knowledge-based systems, and deep learning models are described above as reference examples of rules and models that functions may include, alternative configurations may utilize other types of functions or combinations thereof. For example, in one configuration the aspect ratio conversion application 100 may use a nearest neighbors technique, such as the k-nearest neighbors algorithm. The k-nearest neighbors algorithm determines classification or regression outputs based on a measure of feature similarity (e.g., a distance function) to training examples. In one configuration, the aspect ratio conversion application 100 may use the k-nearest neighbors algorithm or a variant thereof to determine, based on features determined for a shot, a number of most similar examples of shots that have been manually converted between the desired aspect ratios via pan and scan in a database of historical pan and scan conversions, and the aspect ratio conversion application 100 may then take an average of the pan and scan framings in the most similar examples as the framings for the image frames in the shot. More generally, any functions suitable for solving the regression problem of predicting, on a shot-by-shot basis, pan and scan conversions of image frames between aspect ratios may be used. Although discussed herein primarily with respect to regression outputs, in some embodiments functions may also be trained to output classifications, i.e., identified categor(ies), such as one of a number of predefined pan and scan framings for each image frame and/or shot.

Returning to FIG. 1, subsequent to predicting pan and scan framings for the image frames of the input video 102 on a shot-by-shot basis, the aspect ratio conversion module 130 crops the image frames based on the predicted framings and then outputs the cropped image frames as an output video 140. In some configurations, the aspect ratio conversion application 100 (or another application) may also receive and apply user modifications to the predicted pan and scan framings. For example, a film studio may be contractually obligated to obtain a film maker's approval on pan and scan conversions of the film maker's movies. The aspect ratio conversion application 100 (or another application) may permit users, such as the film maker in the above example, to make manual modifications to automatically predicted pan and scan framings by, e.g., providing a preview of the predicted framings and tools to change those framings, as discussed in greater detail below with respect to FIG. 4.

Figure 3:
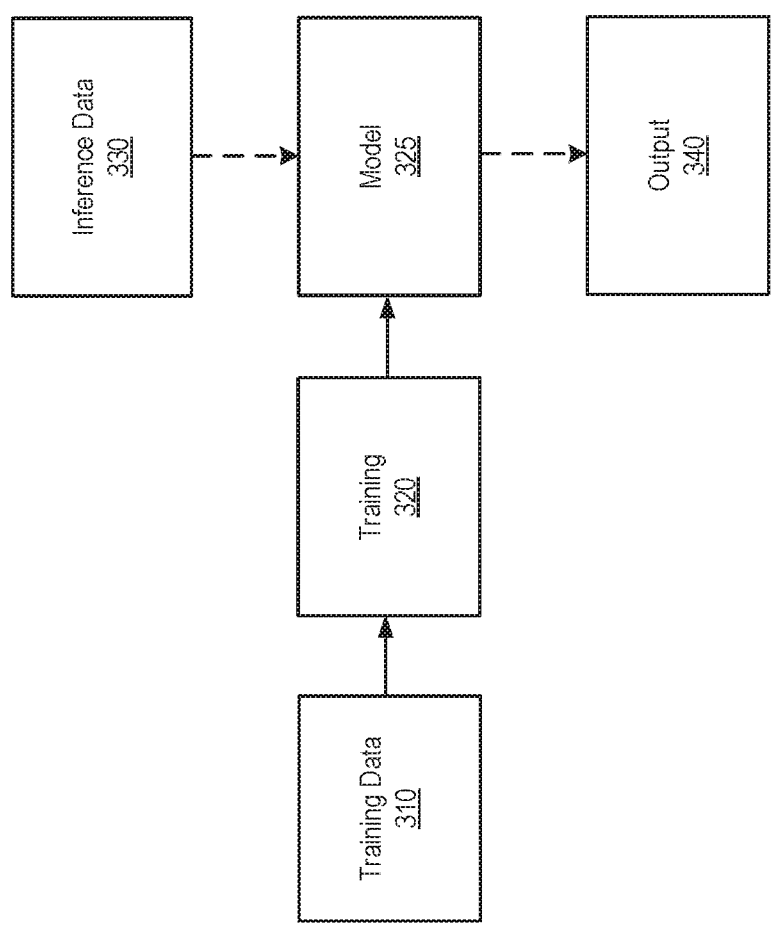
FIG. 3 illustrates the training of a model and inference using the trained model, according to an aspect of this disclosure.

FIG. 3 illustrates the training of a model 325 and inference using the trained model 325, according to an aspect of this disclosure. For example, the trained model 325 may be included in one of the functions $210_i$ described above. Although the training of a model 325 is shown for illustrative purposes, a model training application (which may be the aspect ratio conversion application 100 itself or another application) may generally obtain any number of functions including models and/or rules using machine learning training techniques. Distinct functions may be obtained using appropriate training data to, e.g., predict conversions between different input and output aspect ratios; predict conversion decisions by different film makers or film companies; predict conversion decisions for different genres (e.g., live action, animated, action, comedy, etc.), film franchises, or overall styles; or for any other purpose.

As shown, training data 310 is first used (by, e.g., an offline model training application) to train the model 325 during a training phase 320. In one configuration, the training data 310 includes historical videos in different aspect ratios, with some of the videos being manual pan and scan conversions of other videos. Such training data may be obtained from, e.g., a database or library containing versions of past studio films and/or episodic series episodes represented in different aspect ratios, including pan and scan versions that were created manually (by, e.g., a film maker or mastering artist with approval by a film maker). Further, the training data that is used to train different models may include different historical pan and scan conversions made by hand. For example, a model being trained to predict pan and scan framings for a particular film maker, film company, genre, etc. may be trained using training data specific to the film maker, film company, genre, etc. Subsequent to training, additional inference data 330 is input into the trained model 325 during an inference phase to generate an output 340 which includes pan and scan framing predictions made by the trained model 325. Although not shown, the training data 310 may also be prepared prior to being used in training, such as by extracting features from the training data 310 and determining historical pan and scan framing decisions to use as output examples by comparing versions of the same training data videos in different aspect ratios (if such output examples are not otherwise provided, such as by a user). As described, the extracted features may include features indicating visual and/or audio elements associated with shots in some configurations, and such features may be determined from videos themselves, associated metadata, and/or elsewhere.

The training process at 320 may use any suitable training technique(s), and the particular technique(s) chosen will generally depend on the type of model (or rule) being trained. For example, the back-propagation with gradient descent described above may be used to train a deep learning model. As another example, the ID3, C4.5, CART, CHAID, or MARS techniques described above may be used to train a decision tree. In some configurations, the training process at 320 uses a subset of the training data 310 to train the model 325, which is then evaluated using another subset of the training data 310. For example, a majority of the training data 310 may be used to train the model 325, and a remainder of the training data 310 used to evaluate the trained model 325. Evaluation of the trained model 325 may include validating that the model 325 performs sufficiently well in making pan and scan framing predictions, such as producing pan and scan framing predictions that are less than a desired error from the manual pan and scan framings in the evaluation data set. The goal of training is to obtain a model (or rule) capable of predicting what a user such as a film maker would choose as the pan and scan framing for image frames of a video being converted from one aspect ratio to another. Although one set of training data 310 is shown for illustrative purposes, additional training data (e.g., automatically predicted pan and scan framings that are later modified by film makers) may also be used to re-train and improve a previously trained model.

As shown, the inference phase includes receiving inference data 330, which may include a video such as a film or episodic series episode or a portion thereof, as well as associated metadata, that the model 325 has not seen before and, assuming the model 325 is selected for use by the aspect ratio conversion module 130, inputting the inference data 330, after preparing such data in the same manner the training data 310 was prepared (by, e.g., extract features), into the model 325. In turn, the model 325 generates as output 340 pan and scan framings for image frames of shots in the video that are predictive of what a user, such a film maker, would have chosen.

Figure 4:
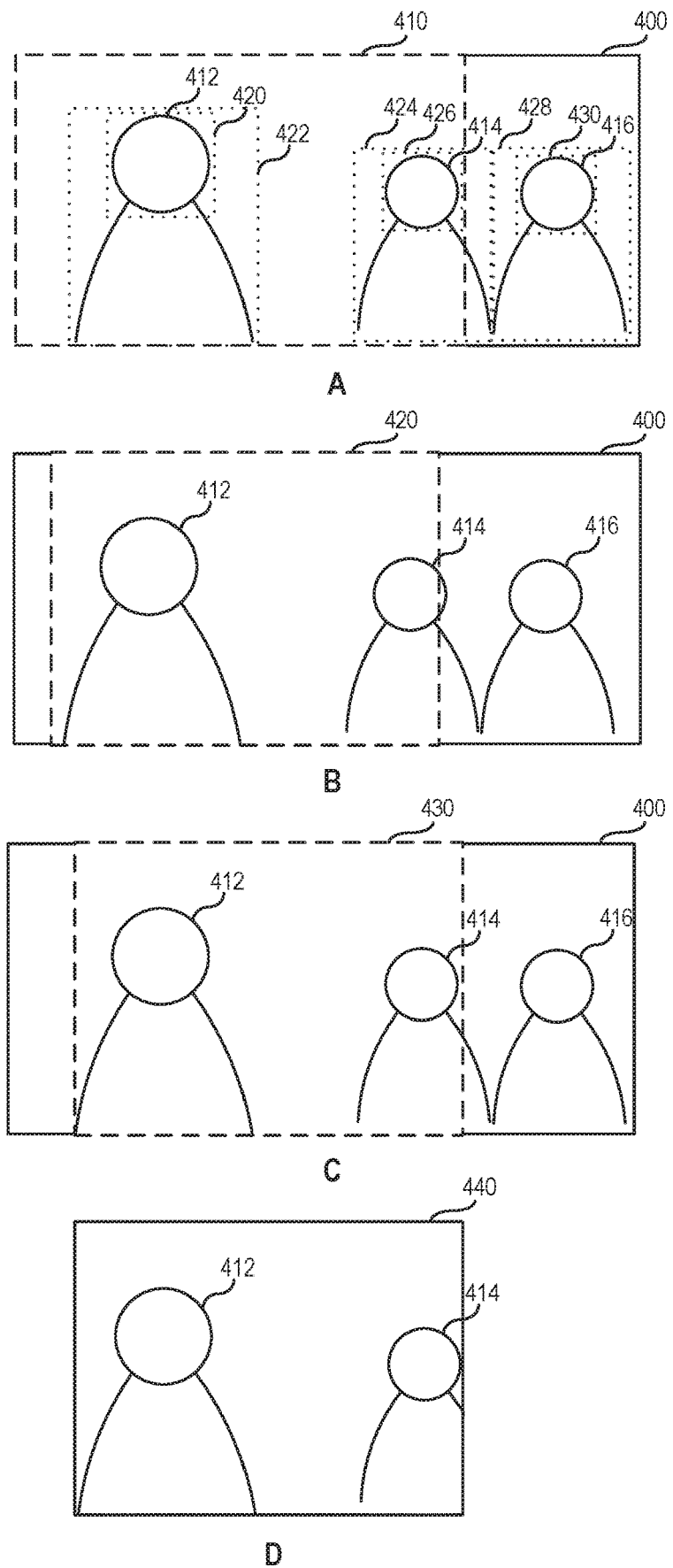
FIG. 4 illustrates an example pan and scan conversion, according to an aspect of this disclosure.

FIG. 4 illustrates an example pan and scan conversion, according to an aspect of this disclosure. Although the conversion of a single image frame 400 from a wide-screen aspect ratio to a smaller aspect ratio is shown for illustrative purposes, the aspect ratio conversion application 100 may generally convert multiple frames of a video between aspect ratios on a shot-by-shot basis, as described above. Further, FIG. 4 is described for simplicity with respect to actions performed by the aspect ratio conversion application 100, but it should be understood that the actions may actually be performed by components of the aspect ratio conversion application 100 (e.g., the shot identification module 110, feature extraction module 120, and aspect ratio conversion module 130 described above), or any other system configured to perform the described actions.

The example illustrated in FIG. 4 assumes the aspect ratio conversion application 100 uses a function that includes a trained model (e.g., a decision tree or deep learning model) to predict where to crop the wide-screen image frame 400, as well as the user-defined rule described above that if a speaking character is identified in a shot, then the speaking character must appear in the reframed image frames of the shot. As shown in panel A, the aspect ratio conversion application 100 extracts features including visual and audio elements, shown as bounding boxes 420 and 422, 424 and 426, and 428 and 430 around characters 412, 414, and 416 and their faces, respectively, as well as determining that the character 412 is speaking in the shot. Other features indicating visual (e.g., image characteristics and technical information) and audio (e.g., music or the topic of a dialog) elements of a shot and/or creative information may also be extracted, as described above.

Based on the rule that speaking characters must appear in the output image frames of a shot, the aspect ratio conversion application 100 determines a region 410 of the wide-screen image frame 400 that can be cropped to the smaller aspect ratio while preserving the speaking character 412 in a reframed image frame. For example, if a very right side of the wide-screen image frame 400 were to be selected as the framing for the smaller aspect ratio, then the speaking character 412 may be (at least partially) cropped out, as the speaking character 412 appears on the left side of the wide-screen image frame 400. The aspect ratio conversion application 100 may prevent such a removal of the speaking character 412 by determining the region 410 in which no pan and scan framing prediction can result in the speaking character 412 being cropped out. For example, the aspect ratio conversion application 100 may determine a region of the wide-screen image frame 400 for which the right- and left-most framings would preserve the speaking character 412 in the output image frame in the smaller aspect ratio.

As shown in panel B, the aspect ratio conversion application 100 uses a function, which may include trained model(s) and/or rule(s), to determine a pan and scan framing prediction 420 for the image frame 400. In one configuration, the determined region 410 of the wide-screen image frame 400 is (resized as appropriate and) input into the function, which in turn outputs the pan and scan framing prediction 420.

As shown in panel C, a user modification is made to the predicted pan and scan framing 420, resulting in a different framing 430. Panel D shows an output image frame 440 after the wide-screen image frame 400 is cropped according to the framing 430. In one configuration, the aspect ratio conversion application 100 (or another application) provides a user interface that is displayed via a display device and allows users to preview automatically predicted pan and scan framings, such as the framing prediction 420, as well as to modify such framing predictions. As described, a film studio may be contractually obligated to obtain a film maker's approval on pan and scan conversions of the film maker's movies, in which case the film maker may be permitted to modify automatically predicted pan and scan framings.

Figure 5:
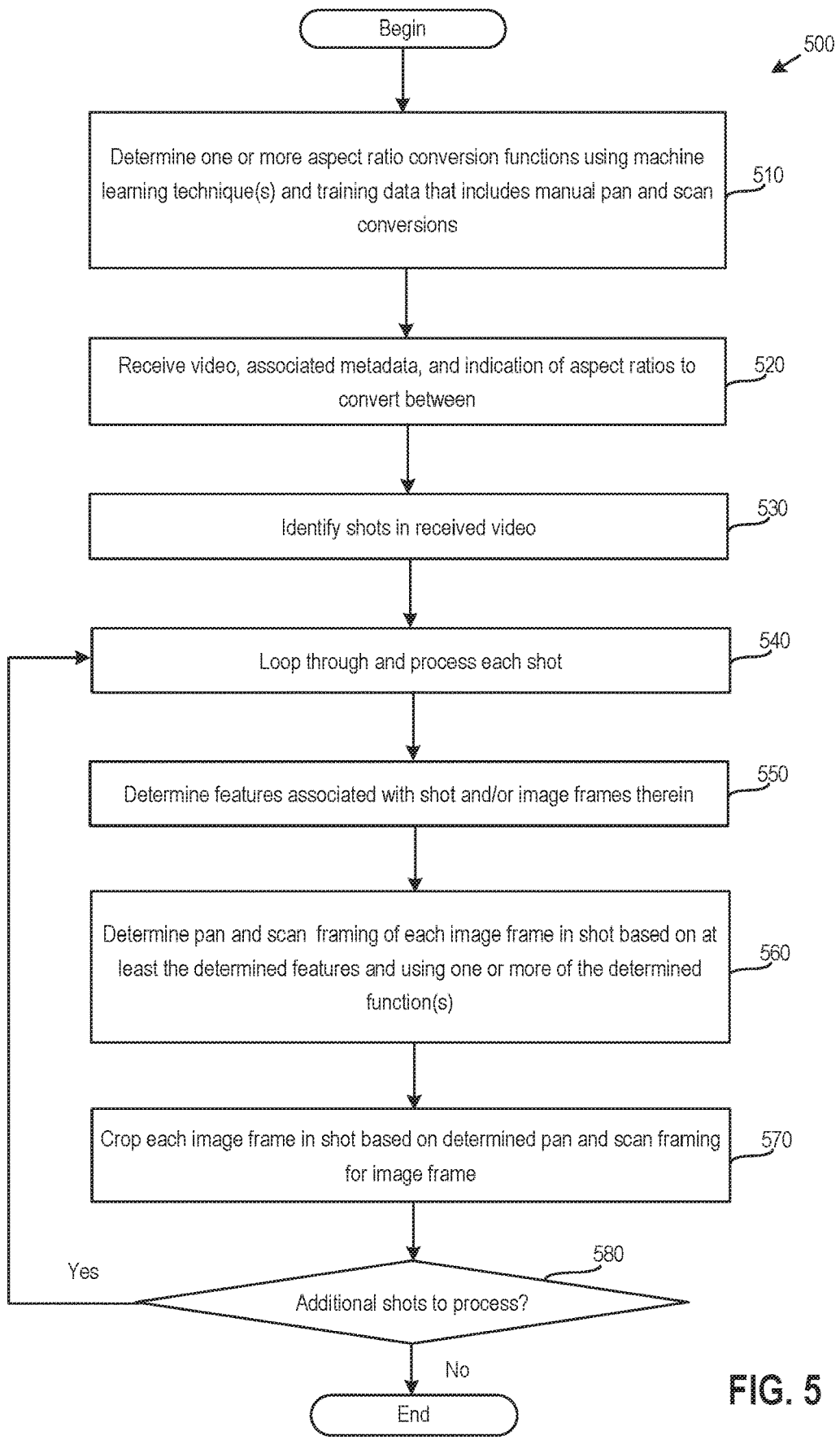
FIG. 5 illustrates a method for converting image frames between aspect ratios, according to an aspect of this disclosure.

FIG. 5 illustrates a method 500 for converting image frames between aspect ratios, according to an aspect of this disclosure. Although the method 500 is described with respect to actions performed by the aspect ratio conversion application 100, it should be understood that the steps of the method 500 may actually be performed by components of the aspect ratio conversion application 100 (e.g., the shot identification module 110, feature extraction module 120, and aspect ratio conversion module 130 described above), or more generally any system configured to perform the method steps, in any order, in some configurations.

As shown, the method 500 begins at step 510, where the aspect ratio conversion application 100 (or another application) determines one or more aspect ratio conversion functions using machine learning technique(s) and training data that includes manual pan and scan conversions. As described, each of the aspect ratio conversion function(s) may include one or more rules and/or models, such as the decision tree rules, rules in knowledge-based systems, and deep learning models described above, which may be obtained through appropriate machine learning training techniques (e.g., decision tree learning algorithms for decision trees, back-propagation with gradient descent for deep learning models, etc.). Features such as features indicating visual and audio elements associated with shots from videos may be extracted for training (and later inference) purposes, and output examples of manual pan and scan framing decisions may also be automatically determined by, e.g., comparing versions of the same training data videos in different aspect ratios (if such output examples are not otherwise provided such as by a user). The aspect ratio conversion functions may (or may not) also include user-defined rules.

At step 520, the aspect ratio conversion application 100 receives a video, associated metadata, and an indication of aspect ratios to convert between. The received video was not part of the training data set but is instead input into one or more of the aspect ratio conversion function(s) determined at step 510.

At step 530, the aspect ratio conversion application 100 identifies shots in the received video. The aspect ratio conversion application 100 may use any suitable technique(s) to identify the shots, such as automatic techniques that detect boundaries of shots or by determining shots from the received metadata if such metadata indicates shot boundaries.

At step 540, the aspect ratio conversion application 100 loops through and processes each of the identified shots. Although described for simplicity as a loop, the processing of some (or all) of the identified shots (as well as other processing) may alternatively be performed in parallel.

For one of the identified shots, the aspect ratio conversion application 100 determines features associated with the shot and/or particular image frames therein at step 550. As described, the features may indicate visual elements (e.g., objects that appear in image frames of the shot; tracked movements of such objects; the directions that characters are facing; image characteristics such as whether the image frames depict bright or dark scenes, whether the image frames depict day or night scenes, a contrast, a saturation, a grain, a sharpness, and/or animations; and technical information such as camera lenses used to capture the image frames in the shot, whether the image frames depict digital or film images, whether the image frames depict live action or animated content, a year, etc.), audio elements (e.g., speaking characters, music that is playing, the topic of a dialog, etc.), and/or creative information (e.g., a film maker, brand, genre, film company, episodic series, franchise, etc. associated with the received video). Each of the features may be determined from metadata associated with the received video if such metadata includes information relating to the feature, or the aspect ratio conversion application 100 may independently determine the feature in any suitable manner, such as using CNNs to classify and localize objects, voice recognition and matching to a visually-identified character or mouth movement to determine characters who are speaking, etc., as described above.

At step 560, the aspect ratio conversion application 100 determines a pan and scan framing of each image frame in the shot based on at least the features determined at step 530 and using one or more of the function(s) determined at step 510. As described, the aspect ratio conversion application 100 may select and use appropriate function(s) (e.g., a function specifically for the input and output aspect ratios or for a particular film maker or film studio), with each selected function including suitable automatically learned or user-defined rule(s) and/or model(s), as described above. In addition, the aspect ratio conversion application 100 (or another application) may also permit users to modify the automatically determined pan and scan framing predictions.

At step 570, the aspect ratio conversion application 100 crops each image frame in the shot based on the determined pan and scan framing for the image frame (or the user modification to an automatically determined pan and scan framing). Then at step 580, if there are additional shots to process, the method 500 returns to step 540, where the aspect ratio conversion application 100 continues looping through and processing the identified shots in the video.

Figure 6:
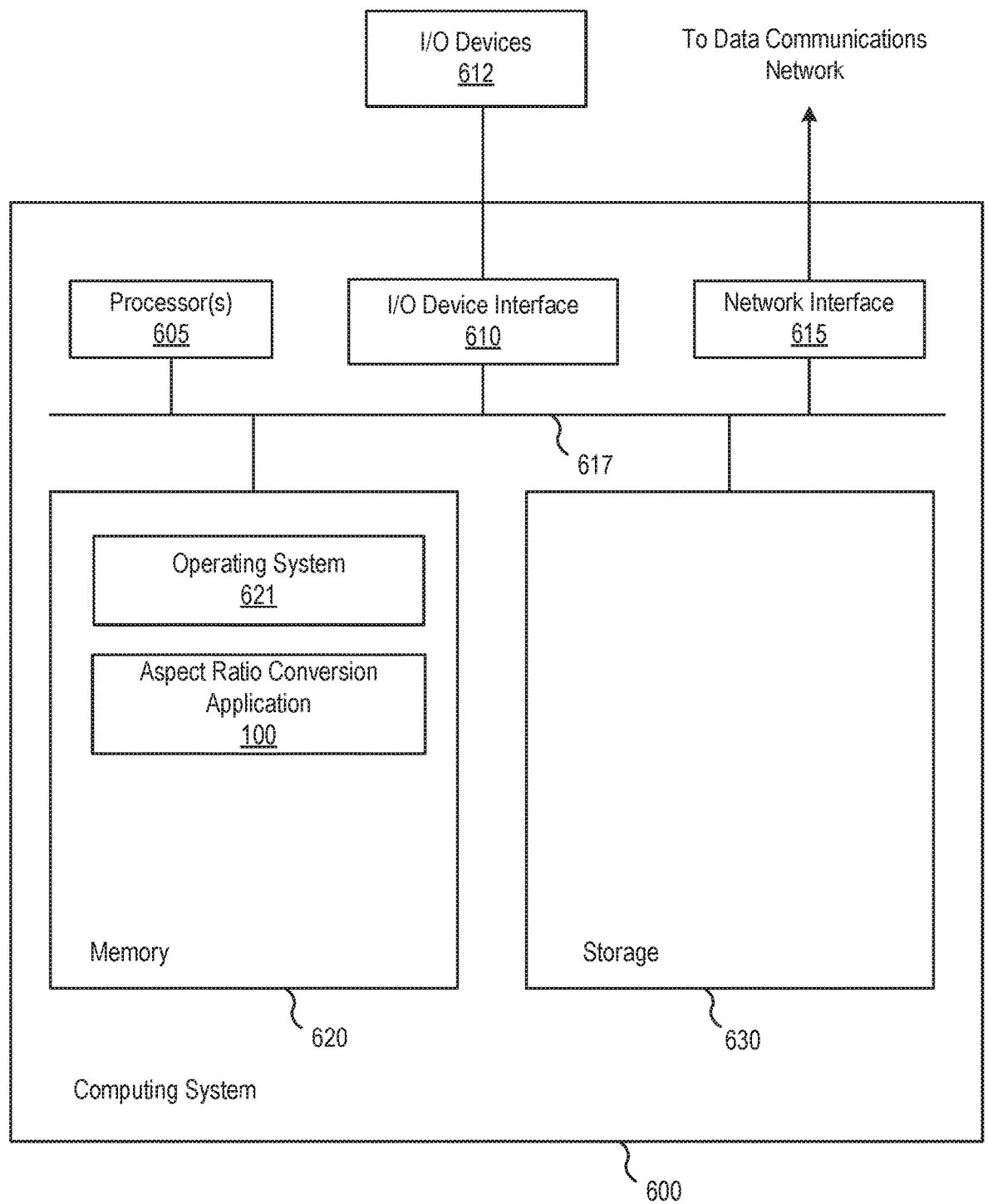
FIG. 6 illustrates a system in which an aspect of this disclosure may be implemented.

FIG. 6 illustrates a system 600 in which an aspect of this disclosure may be implemented. As shown, the system 600 includes, without limitation, a central processing unit (CPU) 605, a network interface 615 connecting the system 600 to a network 616, an interconnect 617, a memory 620, and storage 630. The system 600 also includes an I/O device interface 610 connecting I/O devices 612 (e.g., keyboard, display and mouse devices) to the system 600.

The CPU 605 retrieves and executes programming instructions stored in the memory 620. Similarly, the CPU 605 stores and retrieves application data residing in the memory 620. The interconnect 617 facilitates transmission, such as of programming instructions and application data, between the CPU 605, I/O device interface 610, storage 630, network interface 615, and memory 620. The CPU 605 is included to be representative of a single CPU, multiple CPUs, a single CPU having multiple processing cores, one or more graphics processing units (GPUs), a combination of such processors, and other types of processor(s). And the memory 620 is generally included to be representative of a random access memory. The storage 630 may be a disk drive storage device. Although shown as a single unit, the storage 630 may be a combination of fixed and/or removable storage devices, such as magnetic disk drives, flash drives, removable memory cards or optical storage, network attached storage (NAS), or a storage area-network (SAN). Further, the system 600 is included to be representative of a physical computing system as well as virtual machine instances hosted on a set of underlying physical computing systems. Further still, although shown as a single computing system, one of ordinary skill in the art will recognized that the components of the system 600 shown in FIG. 6 may be distributed across multiple computing systems connected by a data communications network.

As shown, the memory 620 includes an operating system 621 and the aspect ratio conversion application 100. The operating system 621 may be, e.g., Linux® or Windows®. The aspect ratio conversion application 100 is configured to convert image frames, such as those of a film or episodic series episode, between aspect ratios. In one configuration, the aspect ratio conversion application 100 is configured to determine one or more aspect ratio conversion functions, using machine learning technique(s) and training data that includes manual pan and scan conversions; receive a video, associated metadata, and an indication of aspect ratios to convert between; identify shots in the received video; and process each identified shot by: determining features associated with the shot and/or particular image frames therein, determining a pan and scan framing for each image frame in the shot based on at least the determined features and using at least one or more of the determined function(s), and cropping each image frame in the shot based on the determined pan and scan framing for the image frame (or a user modification to an automatically determined pan and scan framing), according to the method 500 described above with respect to FIG. 5.

Although discussed above primarily with respect to converting wide-screen aspect ratio image frames to smaller aspect ratios for home distribution, which requires cropping off sides of the wide-screen aspect ratio image frames, techniques disclosed herein may also be applied to crop off the top and bottoms of image frames if the original aspect ratio is taller than the final aspect ratio, which is also referred to as "tilt and scan" or "reverse pan and scan."

Although discussed above primarily with respect to specific examples of features, in alternative configurations other features may be used. For example, such other features may indicate whether a scene depicted in the image frames of a shot includes direct sunlight or ambient light, whether the scene is indoors or outdoors, a scene mood, etc.

Advantageously, techniques disclosed herein employ specific features, including features indicating visual and audio elements of the image frames in a shot and creative information, to obtain functions using machine learning for predicting the creative decisions a human operator would make in pan and scan conversions between different aspect ratios. As a result, techniques disclosed herein may be used to replace or assist pan and scan conversions that have traditionally been performed manually. Techniques disclosed herein may also permit the relatively efficient and consistent creation of content represented in different aspect ratios, while meeting the expectations of film makers or other individuals whose historical pan and scan decisions were used as examples in the machine learning process. Those film makers or other individuals may then be free to, e.g., spend more time editing the original version of a film or episodic series episode without having to work as much on derivative pan and scan versions.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to aspects of the present disclosure, other and further aspects of this disclosure may be devised without departing from the basic scope thereof, and the scope thereof is determined by the claims that follow.

What is claimed is:

1. A computer-implemented method, the method comprising:
   determining, using a machine learning (ML) model, an aspect ratio conversion function configured to convert images from a first aspect ratio to a second aspect ratio, wherein the ML model is trained using both (i) first extracted features which indicate at least one of visual or audio elements associated with a first plurality of image frames in shots from videos in the first aspect ratio, and (ii) manual framing decisions in pan and scan conversions of the first plurality of image frames in the first aspect ratio to a corresponding second plurality of image frames in the second aspect ratio;
   identifying shots in a received video, wherein the shots comprise a third plurality of image frames in the first aspect ratio; and
   for each of the third plurality of image frames in the identified shots, converting the respective image frame from the first aspect ratio to the second aspect ratio using the determined aspect ratio conversion function.

2. The computer-implemented method of claim 1, wherein the converting the third plurality of image frames from the first aspect ratio to the second aspect ratio includes inputting second extracted features indicating at least one of second visual or second audio elements associated with the third plurality of image frames into the determined aspect ratio conversion function.

3. The method of claim 2, further comprising identifying that one or more characters in the received video are speaking based, at least in part, on at least one of (i) mouth movement of the one or more characters in the third plurality of image frames, or (ii) recognition of one or more voices and matching of the recognized one or more voices to visual depictions of the one or more characters in the third plurality of image frames,
   wherein the second extracted features indicate second audio elements relating to speech of the one or more characters who are identified as speaking.

4. The method of claim 2, wherein the second extracted features indicate second audio elements associated with the third plurality of image frames, and wherein the second audio elements include music being played.

5. The method of claim 2, wherein the second extracted features indicate second visual elements associated with the third plurality of image frames, and wherein the second visual elements include at least one of an object appearing in the third plurality of image frames, a camera lens used to capture the third plurality of image frames, whether the third plurality of image frames are digital or film image frames, whether the third plurality of image frames include live action or animated content, or a characteristic of the third plurality of image frames.

6. The method of claim 5, wherein the second visual elements include the object appearing in the third plurality image frames, and wherein the object comprises at least one of a character, creature, prop, on-screen text, or environmental object.

7. The method of claim 5, wherein the second visual elements include the characteristic of the third plurality of image frames, and wherein the characteristic of the third plurality of image frames include at least one of whether the third plurality of image frames depict a daytime or nighttime scene, whether the third plurality of image frames are bright or dark, whether the third plurality of image frames were captured with direct sunlight or ambient light, whether the third plurality of image frames depict an indoor or outdoor scene, or a mood of a scene depicted in the third plurality of image frames.

8. The method of claim 2, wherein the converting the third plurality of image frames from the first aspect ratio to the second aspect ratio is further based on at least one of a film maker, a brand, a genre, a film company, an episodic series, or a film franchise associated with the received video.

9. The method of claim 1, wherein the determined aspect ratio conversion function includes at least one of a rule in a knowledge-based system, a decision tree, or a deep learning model.

10. The method of claim 1, further comprising, receiving and applying a user modification to a framing of the respective image frame determined in the converting of the third plurality of image frames from the first aspect ratio to the second aspect ratio.

11. A non-transitory computer-readable storage medium including instructions that, when executed by a processing unit, cause the processing unit to perform operations comprising:
    determining, using a machine learning (ML) model, an aspect ratio conversion function configured to convert images from a first aspect ratio to a second aspect ratio, wherein the ML model is trained using both (i) first extracted features which indicate at least one of visual or audio elements associated with a first plurality of image frames in shots from videos in the first aspect ratio, and (ii) manual framing decisions in pan and scan conversions of the first plurality of image frames in the first aspect ratio to a corresponding second plurality of image frames in the second aspect ratio;
    identifying shots in a received video, wherein the shots comprise a third plurality of image frames in the first aspect ratio; and
    for each of the third plurality of image frames in the identified shots, converting the respective image frame from the first aspect ratio to the second aspect ratio using the determined aspect ratio conversion function.

12. The computer-readable storage medium of claim 11, wherein the converting the third plurality of image frames from the first aspect ratio to the second aspect ratio includes inputting second extracted features indicating at least one of second visual or second audio elements associated with the third plurality of image frames into the determined aspect ratio conversion function.

13. The computer-readable storage medium of claim 12, the operations further comprising identifying that one or more characters in the received video are speaking based, at least in part, on at least one of (i) mouth movement of the one or more characters in the third plurality of image frames, or (ii) recognition of one or more voices and matching of the recognized one or more voices to visual depictions of the one or more characters in the third plurality of image frames,
wherein the second extracted features indicate second audio elements relating to speech of the one or more characters who are identified as speaking.

14. The computer-readable storage medium of claim 12, wherein the second extracted features indicate second audio elements associated with the third plurality of image frames, and wherein the second audio elements include music being played.

15. The computer-readable storage medium of claim 12, wherein the second extracted features indicate second visual elements associated with the third plurality of image frames, and wherein the second visual elements include at least one of an object appearing in the third plurality of image frames, a camera lens used to capture the third plurality of image frames, whether the third plurality of image frames are digital or film image frames, whether the third plurality of image frames include live action or animated content, or a characteristic of the third plurality of image frames.

16. The computer-readable storage medium of claim 15, wherein the second visual elements include the object appearing in the third plurality image frames, and wherein the object comprises at least one of a character, creature, prop, on-screen text, or environmental object.

17. The computer-readable storage medium of claim 15, wherein the second visual elements include the characteristic of the third plurality of image frames, and wherein the characteristic of the third plurality of image frames include at least one of whether the third plurality of image frames depict a daytime or nighttime scene, whether the third plurality of image frames are bright or dark, whether the third plurality of image frames were captured with direct sunlight or ambient light, whether the third plurality of image frames depict an indoor or outdoor scene, or a mood of a scene depicted in the third plurality of image frames.

18. The computer-readable storage medium of claim 12, wherein the converting the third plurality of image frames from the first aspect ratio to the second aspect ratio is further based on at least one of a film maker, a brand, a genre, a film company, an episodic series, or a film franchise associated with the received video.

19. The computer-readable storage medium of claim 11, the operations further comprising, receiving and applying a user modification to a framing of the respective image frame determined in the converting of the third plurality of image frames from the first aspect ratio to the second aspect ratio.

20. A system, comprising:
one or more processors; and
a memory containing a program that, when executed on the one or more processors, performs operations comprising:
determining, using a machine learning (ML) model, an aspect ratio conversion function configured to convert images from a first aspect ratio to a second aspect ratio, wherein the ML model is trained using both (i) first extracted features which indicate at least one of visual or audio elements associated with a first plurality of image frames in shots from videos in the first aspect ratio, and (ii) manual framing decisions in pan and scan conversions of the first plurality of image frames in the first aspect ratio to a corresponding second plurality of image frames in the second aspect ratio;
identifying shots in a received video, wherein the shots comprise a third plurality of image frames in the first aspect ratio; and
for each of the third plurality of image frames in the identified shots, converting the respective image frame from the first aspect ratio to the second aspect ratio using the determined aspect ratio conversion function.

21. A computer-implemented method, the method comprising:
determining, using a machine learning (ML) model, an aspect ratio conversion function configured to convert images from a first aspect ratio to a second aspect ratio, wherein the ML model is trained using both (i) first extracted features which indicate at least one of visual or audio elements associated with a first plurality of image frames in shots from videos in the first aspect ratio, and (ii) manual framing decisions in pan and scan conversions of the first plurality of image frames in the first aspect ratio to a corresponding second plurality of image frames in the second aspect ratio;
identifying shots in a received video, wherein the shots comprise a third plurality of image frames in the first aspect ratio;
identifying that one or more characters in the received video are speaking based, at least in part, on at least one of (i) mouth movement of the one or more characters in the third plurality of image frames, or (ii) recognition of one or more voices and matching of the recognized one or more voices to visual depictions of the one or more characters in the third plurality of image frames; and
for each of the third plurality of image frames in the identified, converting the respective image frame from the first aspect ratio to the second aspect ratio using the determined aspect ratio conversion function, comprising:
inputting second extracted features indicating second audio elements associated with the third plurality of image frames into the determined aspect ratio conversion function, wherein the second audio elements relate to speech of the one or more characters who are identified as speaking.

* * * * *